United States Patent
Koslowsky

[11] Patent Number: 5,833,841
[45] Date of Patent: Nov. 10, 1998

[54] METHOD AND APPARATUS FOR PURIFYING WATER AND FOR MAINTAINING THE PURITY THEREOF

[76] Inventor: Peter Koslowsky, Obere Siedlung 9, D-39171 Beyendorf, Germany

[21] Appl. No.: 900,386

[22] Filed: Jul. 12, 1997

[51] Int. Cl.[6] .................................. C02F 5/06; C02F 1/42
[52] U.S. Cl. ..................... 210/96.1; 210/169; 210/198.1; 210/205; 210/220; 210/259; 210/662; 210/665; 210/667; 210/687; 210/758; 210/763
[58] Field of Search .................................. 210/96.1, 169, 210/198.1, 205, 220, 259, 662, 663, 665, 667, 687, 749, 763, 764, 758

[56] References Cited

U.S. PATENT DOCUMENTS

| | | | |
|---|---|---|---|
| 4,017,331 | 4/1977 | Thoelen, Sr. | 239/601 |
| 4,728,442 | 3/1988 | Shuttlewood et al. | 210/755 |
| 5,683,953 | 11/1997 | Mills | 210/681 |

FOREIGN PATENT DOCUMENTS

| | | | |
|---|---|---|---|
| 2159774 | 6/1973 | Germany | C02B 1/04 |
| 2843294 | 4/1980 | Germany | C02B 1/00 |
| 4445689 | 6/1996 | Germany | C02F 1/78 |
| 175037 | 6/1935 | Switzerland . | |
| 280487 | 5/1952 | Switzerland . | |
| 352633 | 4/1961 | Switzerland . | |

OTHER PUBLICATIONS

Roempps Chemie–Lexikon; Franckh'sche Verlagshandlung, Stuttgart, p. 2417.

WABAG; Handbuch Wasser, 8. Auflage, Vulkan–Verlag, Essen, pp. 165–183.

Kittner et al.; Wasserversorgung, 4., durchgesehene Auflage, VEB Verlag fuer Bauwesen, Berlin.

Holluta; Die Chemie und chemische Technologie des Wassers; Ferdinand Enke Verlag, Stuttgart, 1937; pp. 48, 96–98, 108, 152.

Vom Wasser, Ein Jahrbuch fuer Wasserchemie und Wasserreinigungstechnik; XII. Band 1937; Verlag Chemie GmbH., Berlin, 1938, pp. 104–110.

Wasseraufbereitungsanlagen; Technisches Handbuch; VEB Verlag Technik, Berlin, pp. 76–77.

*Primary Examiner*—Neil McCarthy
*Attorney, Agent, or Firm*—Karl Hormann

[57] ABSTRACT

The invention relates to a method and apparatus for purifying and maintaining the purity of water in a swimming pool by initially feeding into the pool water treated in an ion exchanger to render it acidic and hardness-free, lime water consisting of a clear and saturated aqueous solution of white lime or white lime hydrate being thereafter added to provide a lime-carbonic acid equilibrium, at least some of the acidic and hardness-free water being recirculated over a body of crushed limestone to establish a pH of not less than 7. Carbon dioxide and oxygen may also be added.

19 Claims, 1 Drawing Sheet

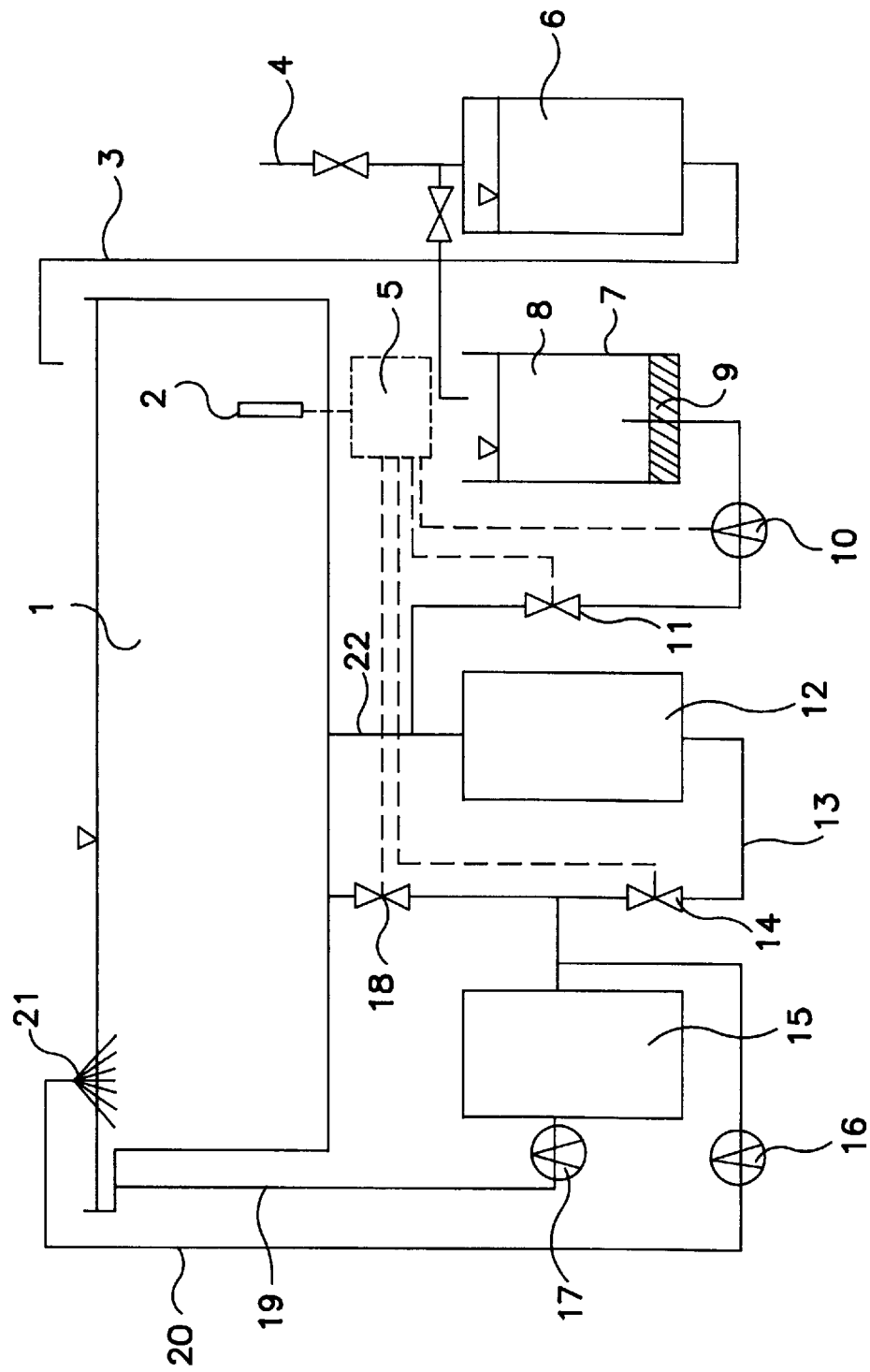

METHOD AND APPARATUS FOR PURIFYING WATER AND FOR MAINTAINING THE PURITY THEREOF

BACKGROUND OF THE INVENTION

1. Field of the Invention

The invention, in general, relates to a method of and an apparatus for purifying and maintaining the purity of water and, more particularly, to a novel method and apparatus of the kind in which a substance is utilized to purify water in swimming pools and the like.

2. The State of the Art

It has been common practice to add chemical additives such as, but not limited to, softeners, disinfectants, pH control agents, flocculants, etc. to the water in swimming pools is well known in the art. Such compounds are added to the water either simultaneously or in a predetermined sequence in order to prevent clouding and bacterial contamination as well as to soften the water. Chlorine compounds, in particular, are used for such purposes.

The inherent disadvantage of treatments of this kind is that the purchase and storage of the chemicals are expensive, and that to use them properly is unduly difficult and complex. Moreover, their concentration usually renders them toxic and physiologically unsafe, and, for children in particular, such chemicals can even be dangerous. Once added to water, they remain therein until their effective-ness is reduced to the point at which more such chemicals are added to increase their concentration. At any event, the chemicals remain in the water permanently, and they require regular supervision or monitoring by their user. Not only are the chemicals in and of themselves environment-ally hazardous, but they also pollute the environment beginn-ing with their manufacture and ending with their final disposal. Nor is their application free of unpleasant side effects in terms of the health and well being of their user. The best-known or most common side effects are conjunctivi-tis of the eyes induced by chlorinated water and the unpleasant odor and taste of such water.

OBJECTS OF THE INVENTION

It is, therefore, a primary object of the invention to provide an apparatus for purifying water in swimming pools in an easy and efficient manner.

A more specific object of the invention is to provide an apparatus capable of purifying water in swimming pools and the like without recourse to any of the usual and potentially hazardous chemical additives.

Another object of the invention is to provide an appa-ratus for purifying water in swimming pools by natural, physiologically harmless and environmentally safe substances.

Yet another object of the invention is to provide an apparatus for purifying water in swimming pools by such substances as limestone, calcium carbonate or calcite (hereinafter sometimes called lime), carbon dioxide, carbonic acid and air.

Still further, it is an object of the invention to provide an apparatus for purifying water in swimming pools and the like by establishing therein a lime-carbonic acid equilibrium.

Yet another object of the invention is to provide an apparatus for purifying water in swimming pools suitable for cost-efficient retro-fitting in existing filtering circuits.

Moreover, it is an object of the invention to provide a novel method of treating water in swimming pools for the purification thereof by utilizing environmentally safe and physiologically harmless substances.

Another object of the invention is to provide a method of maintaining the purity of water in swimming pools by simple and effective environmentally safe and physiological-ly harmless means.

BRIEF SUMMARY OF THE INVENTION

In the accomplishment of these and other objects, the invention, in a preferred embodiment thereof, provides for a novel apparatus for filtering, purifying and softening water in swimming pools or the like where it is substantially constantly recirculated by pumps and conduits, by initially filling a swimming pool with water rendered acidic and hardness-free (softened) by treatment in an ion exchanger, by thereafter adding to the swimming pool water lime water, i.e., a clear saturated solution of one of white lime or hydrate of white lime in an amount yielding a lime-carbonic acid equilibrium, whereby all free carbon dioxide in the water is associated with the carbonate hardness thereof, lime is precipitated when phosphate and sulfate in the water are converted into poorly soluble calcium salts, whereby exogenous matter, such as squamae, cosmetic creams and bath oils are precipitated as lime soap, and inorganic oxidation products are precipitated by calcium ions under the influence of sun light, and whereby calcite adsorbs minute suspended and precipitated particles which defy filtering out by conventional methods into larger surface structures; by circulating at least some of the water thus treated over a bed of crushed limestone by means of conduits, pumps, valves and filters, and by maintaining the water at a pH value not less than 7 by adding further lime water as required to render the water-specific concentration ratios of the lime-carbonic acid equilibrium adjustable along its equilibrium curve, without destroying the equilibrium; and by replenishing water lost as a result of bathing, evaporation or back-flushing of the filter plant by adding acidic and hardness-free water to prevent increases in the level of salt in the water.

Other objects and advantages of the invention will in part be obvious and will in part appear hereinafter.

DESCRIPTION OF THE DRAWING

The novel features which are considered to be characteristic of the invention are set forth with particularity in the appended claims. The invention itself, however, in respect of its operating steps and the sequence thereof, and the structure, construction and lay-out as well as manufac-turing techniques involved in apparatus for practicing the invention, together with other objects and advantages thereof, will be best understood from the following description of preferred embodiments when read with reference to the appended sole drawing which schematically depicts a swimming pool provided with an apparatus in accordance with the invention.

DETAILED DESCRIPTION OF THE PREFERRED EMBODIMENT

As used herein, lime in general is understood to mean limestone, calcium carbonate or calcite, but at any rate compounds other than calcium oxide.

A receptacle such as a swimming pool measuring about 7×2×4 m is filled with 50 m$^3$ of fresh water fed from a conduit 4 through an ion exchanger 6 for softening by removing both its temporary and its permanent hardness. By its natural absorption of carbon dioxide from the ambient air and supplemental charging with carbon dioxide by the turbulent mixing of air with the water 1 as, for instance, by a strong water jet 21, or by direct feeding of carbon dioxide, and by feeding lime water 8 from a solution and sedimentation tank 7, a pH value not less than 7, preferably between 7.9 and 8.1, is established for the water. In the context of the present invention, lime water is understood to mean a clear and saturated aqueous solution of either white lime or white lime hydrate.

The output of the solution and sedimentation tank 7 is connected to the swimming pool by way of a conduit provided with a valve 11 and a feed pump 10 and feeding into a conduit 22 connected to the swimming pool. The pump 10 and the valve 11 are controlled by a control unit 5 in a manner to be described. The contents of the solution and sedimentation tank 7 are replenished as needed the need arises by way of a branch conduit and valve connected to the fresh water conduit 4, excess lime precipitating as lime sludge 9 on the bottom of the tank 7.

Preferably, the water jet 21 is connected to the output of a filter 15 and is force-fed by a pump 16. It will be understood by those skilled in the art that the suffusion of carbon dioxide into the water 1 by the jet 21 may be period-ic or constant, and that direct feeding of carbon dioxide into the water 1 may be accomplished by pressurized air or by any other means known in the art. While not shown in the drawing, the pump 16 feeding the jet 21 may be connected to the control unit 5 to be activated for selective suffusion of carbon dioxide into the water. Alternatively, carbon dioxide could be infused into the water under the control of the control unit as pressurized gas by means selectively actuated by the control means in a manner well known in the art. Preferably, the water 1 is continuously recirculated by recirculation pumps 16, 17. In this manner, a lime-carbonic acid equilibrium is established as well.

To maintain the equilibrium, the water 1 treated as aforesaid is recirculated by a conduit or pipe 19, recirculation pump 17, filter 15, the valve 14, first conduit 13, a container 12 filled with, for example, 30 $dm^3$ of crushed 30 mm grain size limestone and thence returned to the swimming pool through second conduit 22. Such a flow pattern would feed all of the water through the container 12. As may be seen, however, the output of filter 15 is connected to the junction of valve 14 connecting to the container 12 and another valve 18 connecting to the swimming pool. Therefore, depending upon the state of the valves 14 and 18, either all, none, or a predetermined portion of the water discharged from the filter 15 is fed to the swimming pool through the container 12 so that precipitated calcium ions may be replaced, and the lime-carbonic acid equili-brium may be maintained. Thus, if valve 18 is open and valve 14 is closed the entire output of the pump 17 is fed to the swimming pool through the filter 15. On the other hand, if the valve 18 is closed and valve 14 is open, the entire output of the pump 17 will be transmitted to the swimming pool through the filter 15 and the container 12. If both valves 14 and 18 are partially open, some of the output of the pump 17 will pass through the container 12, the remainder flowing to the swimming pool directly. The relative opening sizes of the valves 14, 18 will determine the proportion of the two water flows. A similar effect could be achieved by a system using a variable output pump 17 instead of two valves 14 and 18.

Preferably, the container 12 filled with crushed limestone is an open container disposed such that its overflow is positioned at a higher level than the level of the water in the swimming pool.

Furthermore, while not shown, those skilled in the art will understand that means may be provided for permanently or temporarily exposing the water to one or more metallic oxidizing catalysts. Catalysts useful in this connection are, among others, platinum, palladium, silver and copper.

The condition of the water 1 in the swimming pool is monitored by a pH value measuring transducer or sensor 2. Measurement signals emitted by the sensor 2 are fed to a control unit 5 which on the basis of the signals controls the flow rate through the valves 11, 14, and 18 and the output of the pumps 10 and 17 in such a way that the condition or quality of the water 1 in the swimming pool remains substantially uniform. In particular, the pump 10 may be intermittently driven whenever significant deviations of the pH value from a desired value have been detected by the sensor 2.

Preferably, the valves 11, 14 and 18 are motorized or solenoid valves. While, as shown, the pumps 16 and 17 are not connected to the control unit 5, it is within the scope of the invention to drive these pumps by the control unit 5 in response to an evaluation of the aforesaid signals. The control unit 5 is of a kind well-known in the art and may, for instance, be provided with look-up tables or computer memories in which water-specific equilibrium curves are stored.

ADVANTAGES OF THE INVENTION

Treatment of the water by adding to it lime water of a certain dosage results in a lime-carbonic acid equilibrium therein so that all free carbon dioxide in the water is associated with its carbonate hardness. In this manner, any algae otherwise providing nutrients for bacteria and germs, are deprived of their own nutrients.

As a result of phosphate and sulfate conversion into poorly soluble calcium salts lime precipitates in the water, thus further diminishing the metabolism and growth of micro-organisms.

Exogenous substances, such as cosmetic creams, bath oils and the like are precipitated as substantially insoluble lime soaps and may thus be mechanically filtered out. The water is softened and rendered acidic by removing cations during treatment of the water in the ion exchanger. By adding lime water, calcium will dominate at a pH value in excess of 7. Sunlight refracted by the water imparts to it a beautiful greenish blue color. Thus, the quality of the water may be judged by its visual appearance, as contamina-tions result in altered light refraction. By feeding oxygen from the air into the water by means of a forceful water jet or by pressurized air, the oxidation process eliminating residual organic matter is substantially enhanced.

The resultant discharge of carbon dioxide leads to the formation of calcite which adsorbs minute suspended and precipitated particles into flakes which may be filtered out.

By using lime of a special quality which contains cer-tain additives such a tracer elements, for instance, spa-like properties may be imparted to the water.

The method in accordance with the invention may be practiced with little technical investment, and it allows the utilization of modern control technology for a substantially automatic operation beyond the mere automatic chemical mechanism.

What is claimed is:

1. An apparatus for purifying and maintaining the purity of swimming pool water, comprising:

receptacle means for receiving a predetermined quantity of water;

means for feeding said water into said receptacle means;

ion exchanger means in said feeding means for rendering said water acidic and hardness-free;

means for feeding into said acidic and hardness-free water lime water comprising a clear saturated solution of one of white lime and white lime hydrate in a quantity establishing a lime-carbonic acid equilibrium, whereby said water is treated by associating all its free carbon dioxide with its carbonate hardness, by lime being precipitated by the conversion of phosphate and sulfate in the water into poorly soluble calcium salts, by exogenous matter being precipitated as lime soap, by inorganic oxidation products being precipitated by calcium ions under the influence of sun light, and by adsorbing minute suspended and precipitated matter into larger bodies by calcite;

means for feeding at least some of said treated water over crushed lime stone thereby to raise the pH value of said water to at least 7; and means for replenishing acidic and hardness-free water lost from bathing, evaporation and filter back-flushing to prevent raising the level of salt in the swimming pool water.

2. The apparatus of claim 1, further comprising means for measuring the pH value of the water in the swimming pool and for generating signals representative of the measured pH value.

3. The apparatus of claim 2, further including means for introducing carbon dioxide into said water.

4. The apparatus of claim 3, wherein said carbon dioxide introducing means comprises a jet of water.

5. The apparatus of claim 3, wherein said means for feeding said treated water over crushed limestone comprises first pump means, filter means, first conduit means and first control valve means.

6. The apparatus of claim 5, wherein said means for feeding said treated water further includes second conduit means and second control valve means for selectively by-passing said crushed limestone.

7. The apparatus of claim 6, further comprising control means connected to said pH value measuring means and to said first and second control valve means for controlling the flow rate therethrough in response to said signals.

8. The apparatus of claim 7, wherein said water feeding means includes variable pump means and third control valve means connected to said control means for control of said pH value in response to said signals.

9. The apparatus of claim 8, wherein said crushed limestone comprises output conduit means and wherein said third control valve means is connected to said output conduit means.

10. The apparatus of claim 9, wherein said crushed limestone is contained in an open container having an overflow disposed above the level of water in the swimming pool.

11. The apparatus of claim 3, wherein said means for introducing carbon dioxide into said water comprises second pump means connected to said control means for selective actuation in response to said signals.

12. The apparatus of claim 3, wherein said means for introducing carbon dioxide into said water comprises pressurized gas means controlled by said control unit.

13. The apparatus of claim 1, further comprising means for selectively introducing oxygen-containing pressurized air into said water.

14. The apparatus of claim 1, wherein said crushed limestone is of a grain size of about 30 mm.

15. The apparatus of claim 1, further comprising means for contacting the water with an oxidizing catalyst selected from the group consisting of platinum, palladium, silver and cooper.

16. A method of purifying and maintaining the purity of water in a swimming pool, comprising the steps of:

treating fresh water in an ion exchanger to render said fresh water acidic and hardness-free;

initially feeding said treated water into said swimming pool;

further treating said treated water by feeding thereinto lime water comprising a clear saturated solution of one of white lime and white lime hydrate in a quantity sufficient to establish a lime-carbonic acid equilibrium in said treated water resulting in an association of all free carbon dioxide in said treated water with the carbonate hardness thereof, precipitation of lime by conversion of phosphate and sulfate into poorly soluble calcium salts, precipitating exogenous substances as lime soap, precipitating inorganic oxidation products by calcium ions under the influence of sunlight and adsorbing minute suspended and precipitated substances defying conventional filtering out into larger surface structures by calcite bodies by calcite of said treated water;

recirculating at least some of said further treated water over a body of crushed limestone to establish in said further treated water a pH value not less than 7; and replenishing lost further treated water by treated water.

17. The method of claim 16, further including the step of introducing carbon dioxide into at least one of said treated and further treated water.

18. The method of claim 16, further including the step of introducing oxygen into at least one of said treated and further treated water.

19. The method of claim 16, further including the step of bringing at least one of said treated and further treated water into contact with an oxidizing catalyst of selected from the group consisting of platinum, palladium, silver and copper.

* * * * *